(12) United States Patent
Post et al.

(10) Patent No.: US 10,110,146 B2
(45) Date of Patent: Oct. 23, 2018

(54) PULSE-TRAIN DRIVE SYSTEM FOR ELECTROSTATIC GENERATORS AND MOTORS

(71) Applicant: Lawrence Livermore National Security, LLC, Livermore, CA (US)

(72) Inventors: Richard F Post, Walnut Creek, CA (US); Edward G Cook, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 418 days.

(21) Appl. No.: 14/503,214

(22) Filed: Sep. 30, 2014

(65) Prior Publication Data

US 2016/0094154 A1 Mar. 31, 2016

(51) Int. Cl.
*H01L 41/29* (2013.01)
*H02N 1/10* (2006.01)
*H02N 1/08* (2006.01)
*H02N 1/00* (2006.01)

(52) U.S. Cl.
CPC .............. *H02N 1/08* (2013.01); *H02N 1/004* (2013.01)

(58) Field of Classification Search
CPC ................................. H02M 3/158; H02M 1/36
See application file for complete search history.

(56) References Cited

U.S. PATENT DOCUMENTS

| | | |
|---|---|---|
| 2,194,839 A | 3/1940 | De Graaff et al. |
| 2,247,783 A | 7/1941 | Massolle |
| 2,523,689 A | 9/1950 | Felici |
| 2,781,460 A | 2/1957 | Felici |
| 2,785,320 A | 3/1957 | Morel |
| 2,818,513 A | 12/1957 | Felici et al. |
| 2,840,729 A | 6/1958 | Kreuthmeir |
| 2,860,264 A | 11/1958 | Felici et al. |
| 3,094,653 A | 6/1963 | Le May et al. |
| 3,210,643 A | 10/1965 | Else et al. |
| 3,629,624 A | 12/1971 | Staudte |
| 3,951,000 A | 4/1976 | Ferriss et al. |
| 4,126,822 A | 11/1978 | Wahlstrom |
| 4,225,801 A | 9/1980 | Parker, Jr. |
| 4,546,292 A | 10/1985 | Audren et al. |

(Continued)

FOREIGN PATENT DOCUMENTS

JP 63-136982 6/1988

OTHER PUBLICATIONS

Trump, "Electrostatic Sources of Electric Power," Electrical Engineering, pp. 525-534, (1947).

*Primary Examiner* — Bickey Dhakal
*Assistant Examiner* — Charles S Laughlin
(74) *Attorney, Agent, or Firm* — John P. Wooldridge

(57) ABSTRACT

A novel motor drive system has been described for use in electrostatic generator/motor systems based on the time variation of capacity of a rotating condenser comprised of segmented rotor and stator elements. It takes advantage of the fact that the motor action of such a system depends only on the rms value of the drive pulses, which therefore can be formed simply by periodically interrupting a high-frequency ac wave train. This new circuitry simplifies the drive system and takes advantage of recent developments of devices used in the art of inversion of dc voltages to high-frequency (tens of kiloHz) ac.

13 Claims, 7 Drawing Sheets

(56) References Cited

U.S. PATENT DOCUMENTS

| | | | |
|---|---|---|---|
| 4,595,852 A | 6/1986 | Gundlach | |
| 4,622,510 A | 11/1986 | Cap | |
| 4,754,185 A | 6/1988 | Gabriel et al. | |
| 4,789,802 A | 12/1988 | Miyake | |
| 4,897,592 A | 1/1990 | Hyde | |
| 5,135,725 A * | 8/1992 | Hendrickson | C01B 13/115 204/176 |
| 5,237,234 A | 8/1993 | Jebens et al. | |
| 5,248,930 A | 9/1993 | Taylor | |
| 5,506,491 A | 4/1996 | Ford | |
| 5,705,902 A | 1/1998 | Merritt et al. | |
| 5,808,383 A | 9/1998 | Kostov et al. | |
| 5,965,968 A | 10/1999 | Robert et al. | |
| 6,353,276 B1 | 3/2002 | Gendron | |
| 6,451,267 B1 * | 9/2002 | Ayad | C01B 13/115 363/136 |
| 6,629,503 B2 | 10/2003 | Post | |
| 6,633,217 B2 | 10/2003 | Post | |
| 6,657,344 B2 | 12/2003 | Post | |
| 6,664,880 B2 | 12/2003 | Post | |
| 6,758,146 B2 | 7/2004 | Post | |
| 6,771,002 B2 | 8/2004 | Jones | |
| 6,858,962 B2 | 2/2005 | Post | |
| 6,906,446 B2 | 6/2005 | Post | |
| 7,230,364 B2 | 6/2007 | Odaka et al. | |
| 7,478,598 B2 | 1/2009 | Post | |
| 7,612,541 B1 * | 11/2009 | Brainard | H02N 1/08 310/309 |
| 7,834,513 B2 | 11/2010 | Post | |
| 8,264,121 B2 | 9/2012 | Post | |
| 8,400,788 B2 * | 3/2013 | Hansson | H02M 7/5381 363/21.02 |
| 8,643,249 B2 | 2/2014 | Post | |
| 9,270,203 B2 * | 2/2016 | Post | H02N 1/00 |
| 2006/0214535 A1 | 9/2006 | Salmon | |
| 2009/0066298 A1 * | 3/2009 | Post | H02N 1/08 322/2 A |
| 2010/0328968 A1 * | 12/2010 | Adragna | H02M 3/335 363/21.02 |
| 2014/0035689 A1 * | 2/2014 | Ozawa | H03B 5/364 331/158 |
| 2014/0176086 A1 * | 6/2014 | Crewson | H02M 3/3376 320/166 |

* cited by examiner

Section A-A'

PULSE-TRAIN DRIVE SYSTEM FOR ELECTROSTATIC GENERATORS AND MOTORS

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to drive systems for electrostatic generators and motors, and more specifically, it relates to pulse-train drive systems for such circuits.

Description of Related Art

Electrostatic generator/motors, as described in the prior art, can be operated in either a generator or a motor mode. This invention describes an improved electronic drive system for applications requiring the motor mode. Such devices have application to flywheels for bulk energy storage, among myriad commercial and defense uses.

In general, electrostatic generator/motors involve the use of an assembly of rotating and stationary elements that together comprise a condenser (or, capacitor), the capacitance of which varies periodically with the motion of the rotating elements relative to the fixed elements. An example of the prior art is shown in FIG. 1A (top view) and in FIG. 1B (side view). Turning now to FIG. 1A, a circular array of fan-like stationary elements, 100, is depicted. Below this stationary array of elements is a similar circular array of elements, which is allowed to rotate about a vertical axis, referred to as the "rotor." FIG. 1B shows a cross-sectional side view of the overall ES structure, showing an embodiment consisting of a set of two rotors, 106, with each respective rotor also comprised of a circular array of fan-like elements. Each respective rotor plate is bound on each circular surface by a stationary array of opposing, fan-like elements, 100, 104, and 102, respectively. The rotor plates are allowed to rotate about an axis oriented orthogonal to the plane of the fixed plate(s), as shown in FIG. 1A.

As shown in FIG. 1B, the rotors are comprised of a set of annular fan-like elements, with each element having a thickness greater than the basic substrate of the disc. In general, the thick fan-like sections elements of the rotor can consist of metallic (conductive) material, dielectric material or combinations thereof. Each pair of fixed fan-like elements, which comprises the opposing stationary plates, forms a capacitor of a fixed gap, g, in between which, each respective rotor traverses. As the moving discs rotate, the capacitance between each pair of opposing stationary plates will vary periodically, owing to differences in the gap dimension, g, and the properties of the rotor material, as each fan-like element of the rotor passes between each respective annular capacitor element in the array.

This structure can be configured either as an electrostatic (ES) generator or as an electrostatic (ES) motor, dependent on the details of an electrical circuit that includes this device. In the so-called "generator mode" of operation, rotation of the moving element results in the generation of an ac voltage arising from the basic equation for the voltage across a charged condenser when the capacitance varies with time, as indicated by Equation (1):

$$V(t) = \frac{q}{C(t)} \quad \text{(Volts)} \tag{1}$$

Here q (Coulombs) is the charge on the condenser and C(t) (Farads) is the time-varying value of the capacitance, the latter owing to the rotation of the element. If the capacitance varies periodically with time, then the ac output of the electrostatic generator will also be periodic, with an ac waveform that depends on the geometry of the time-varying condenser and on the charging circuitry that is employed.

The variable-capacity system described above is a "reciprocal" device, in that it is capable of functioning either as a generator or a motor, depending only on the circuitry to which it is attached. As a generator, an example of which is an energy storage flywheel, the generator output is high-frequency alternating current, which can easily be converted to mains-frequency power. As an example, the high-frequency generator output can be first rectified to dc, with the resultant dc output driving an electronic inverter to produce a 60 Hz output, the latter suitable for commercially powered devices.

By reciprocity, operation of the system in the so-called "motor mode" requires a drive circuitry that generates a pulse-like waveform, which is synchronized with the rotation frequency and phase of the rotating elements.

The physics principle here is exemplified by a simple example, as depicted in FIG. 2. Consider a 1-D parallel-plate capacitor of length L, comprised of a pair of stationary plates, 200 and 204, respectively, separated by a gap of dimension, g. Without loss of generality, assume that the system is fitted with a third plate, 206, also of length L. The third plate 206 is assumed to be a moveable metal (or dielectric) plate, which can be inserted between the pair of stationary plates, along the length of the capacitor, as shown in FIG. 2. This system results in a parallel-plate capacitor (the pair of fixed plates), whose value of the capacitance can be varied as the overlap, x, varies of the moveable plate relative to the fixed parallel plates. In general, as the overlap, x, of the plates increases, there is a concomitant increase in the value of the overall device capacitance.

Consider the case where, initially, there is no overlap of the moveable plate relative to the pair of stationary plates (x=0). That is, all three plates are parallel to each other; however, the central plate, 206, is laterally displaced to the left, by a distance, L, relative to the pair of (overlapping) stationary plates, 200 and 204. In other words, the central plate is initially positioned to be completely outside the gap between the two fixed plates.

Assume now that an external potential, 210, of magnitude $V_0$, is applied across the two stationary plates. Under this condition, as the leading edge of the moveable plate enters the gap between them (i.e., x>0), the moveable plate will be subject to an attractive electrostatic force, $F_{ES}$, that will persist until the plate 206 has reached the point whereby the capacitance of the capacitor is a maximum (x=L). If the plate is moved beyond this maximal point (x>L), so that the capacitance begins to decrease, the direction of the attractive force, $F_{ES}$, will reverse and then approach zero again as the plate emerges from the far side of the capacitor (x>2L).

To optimally apply this electrostatic force on the moveable plate to produce motor action in the same direction, it is necessary to ensure that the driving voltage be turned off during those times when the capacity is decreasing, and vice versa.

In other words, the driving voltage is to be switched "on" as the plate moves forward and enters the gap (x>0)—during which time, the electrostatic force, $F_{ES}$, is attractive—further drawing the plate into the gap. Then, as the moveable plate begins to emerge from the gap (x>L)—during which time the attractive force would have otherwise changed direction—the driving force is switched "off," enabling the plate to continue its forward propagation through the gap (x>L), without any applied force to retard its trajectory.

The physics of the linear device shown in FIG. 2 can be extended to that of a device with circular symmetry, in the context of the ES motor geometry. Turning now to FIG. 3 and FIG. 4, an analogous set of conditions apply. FIG. 3 depicts a top view of an ES motor, and, FIG. 4 shows a cross sectional drawing of the same, along the A-A' cut.

In the example shown in FIG. 3 and FIG. 4, the ES motor consists of two stationary plates, 300 and 304, separated by a fixed distance (or, gap), g, each with a respective set of fixed elements, arranged in an annular pattern. Between these two discs, a rotating plate, 306, is positioned, with a corresponding set of thick fan-like elements, each of which is comprised of conductive and/or dielectric materials. For ease of viewing, the cross-sectional view, A-A', in FIG. 4 depicts a rotor with only a single pair of diametrically opposed thick elements. As the rotor revolves, the capacitance between the stationary plates, 300 and 304, as formed by opposing pairs of the fixed fan-like sections, will vary periodically.

The basic operation of the circular device, in terms of its periodically varying capacitance during operation, can be appreciated by viewing an annular cross section B-B', depicted by the dashed arc in FIG. 3 and, also, by the cross-sectional cut, also labeled as B-B', in FIG. 4. The linear representation of the varying capacitance, as discussed with respect to FIG. 2, provides a good approximation of the salient details that underlie the operation of the circular ES device. Under this approximation, the "arc-axes," labeled by "x" in FIG. 3, are analogous to the linear x-axis shown in FIG. 2. In essence, therefore, the view seen in FIG. 2 is essentially equivalent to the B-B' cross-sectional cut depicted in FIG. 3.

Returning now to FIG. 3, upon the application of a voltage across the pair of fixed capacitor plates, 300 and 304, the thick segments along the rotating plate, 306, will each experience a tangential electrostatic force, $F_{ES}$, in the direction of the stator plates, resulting in a rotation of the rotor in the direction of this force. The rotor will revolve about its axis so that its thick segments will be attracted into the respective regions between the pair of opposing fixed-plate segments, in complete analogy to the linear representation shown in FIG. 2. Upon complete overlap of the rotor segments 306 with the respective segments of the fixed plates, the voltage across the fixed plates 300 and 304 is switched off, so that the rotor continues to freely rotate in the same direction, without any counteracting tangential force. Therefore, the rotor will continue to rotate in the same sense, until it approaches the stationary plates of a subsequent pair of opposing fixed elements. In the case of a rotor with a single-segmented device, this condition will occur after a single revolution. In analogy to motors in general, the IS motor can be scaled so that the rotor and stator consist of more than a single element. Hence, in the case of a multi-segmented device, the condition of subsequent overlap will occur after rotation by an angle of 360°/2n, where n is equal to the number of segments about the annular circumference of the device. In general, at the point of subsequent overlap of the rotor element with that of the stationary pair of elements, the voltage is again switched on, resulting in an attractive tangential force, and, the process repeats. Thus, by proper synchronization and application of the time-dependent attractive force, continuous angular rotation in one direction is realized, thereby resulting in an electrostatic motor.

SUMMARY OF THE INVENTION

A novel motor drive system is described for use in electrostatic generator/motor devices based on the time variation of the capacitance of a rotating condenser, comprised of segmented rotor and stator elements. The embodiments described herein take advantage of the fact that the motor action of such a system depends only on the rms value of the drive pulses, as discussed below with respect to Equation (6), which therefore can be formed by periodically interrupting and gating a high-frequency ac wave train. The drive circuitry simplifies the drive system but also takes advantage of recent developments in the art of inversion of dc voltages to high-frequency ac (e.g., tens of kHz).

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

From electromagnetic theory, a simple expression can be derived that provides the magnitude of the attractive force exerted on the moveable plate in terms of the respective maximum and minimum values of the capacitance, $C_{max}$ and $C_{min}$ (in Farads), the applied voltage, $V_0$ (in Volts), and a functional form factor, f(x). The form factor, f(x), is geometry dependent and corresponds to the variation of the capacitance with displacement, x (meters), where x is the direction along which the moveable plate traverses through the gap between the fixed capacitor plates.

As an example, if the variation of the capacitance scales linearly with displacement, then the expression for the capacitance as a function of displacement would take the form shown in Equations (2) and (3):

$$C(x) = f(x) C_{max} \text{ (Farads)} \qquad (2)$$

with the ansatz $$f(x) = \left[\frac{C_{min}}{C_{max}}\right] + \alpha x \quad (3)$$

Figure 1A:
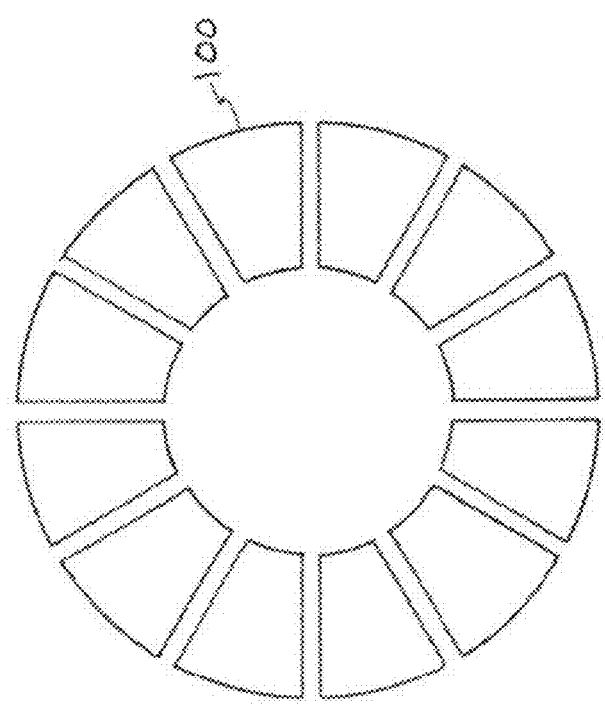
FIG. 1A depicts a top view of a multi-element electrostatic motor in the prior art.
Figure 1B:
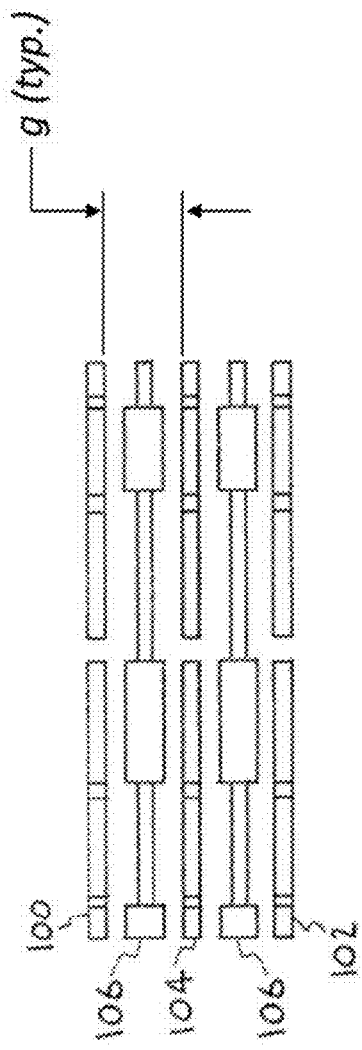
FIG. 1B depicts a cross-sectional side view of the multi-element electrostatic motor of FIG. 1A, in the prior art.
Figure 2:
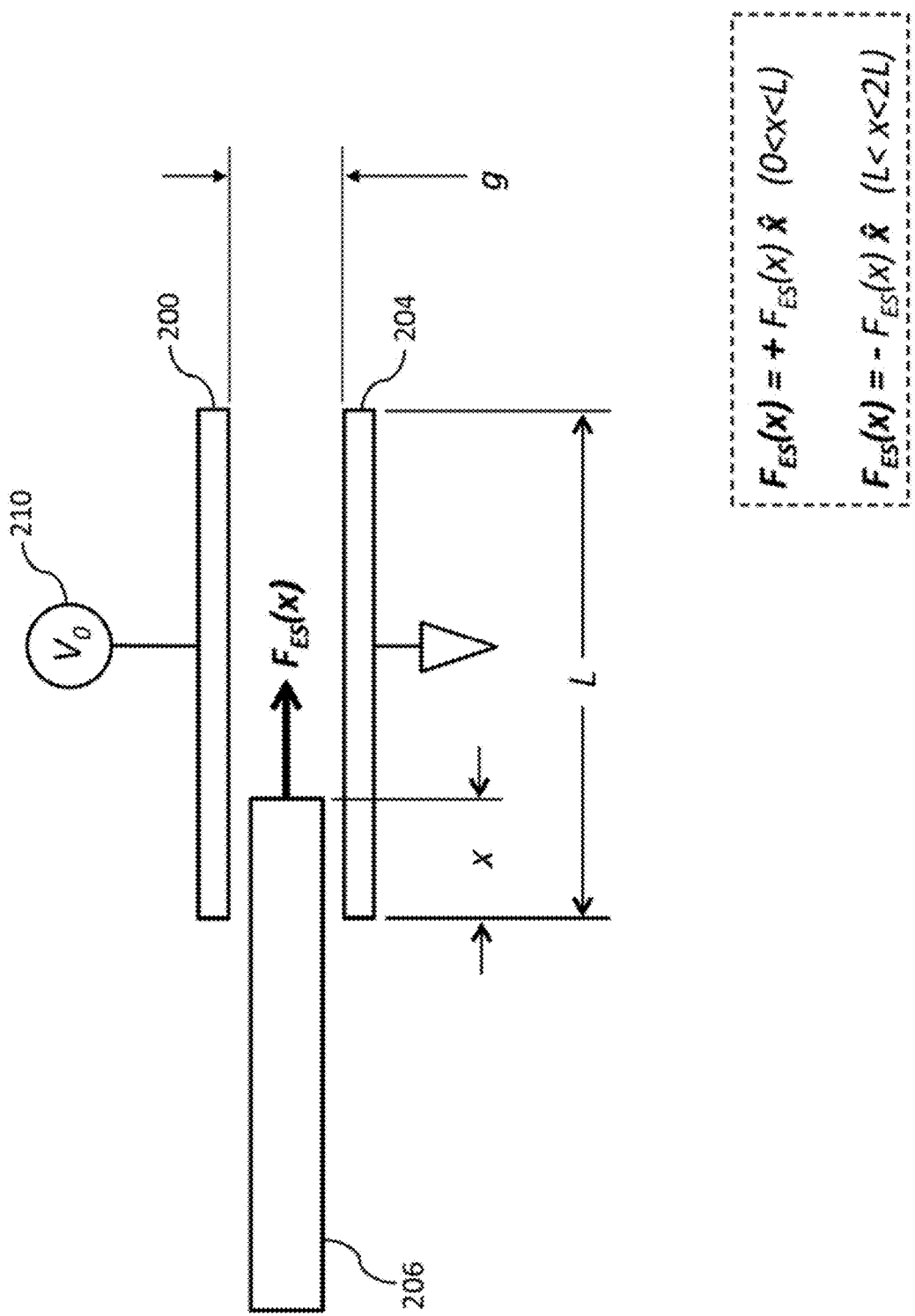
FIG. 2 shows a diagram of a fixed-plate capacitor in the presence of a moveable conductive and/or dielectric material within its gap.
Figure 3:
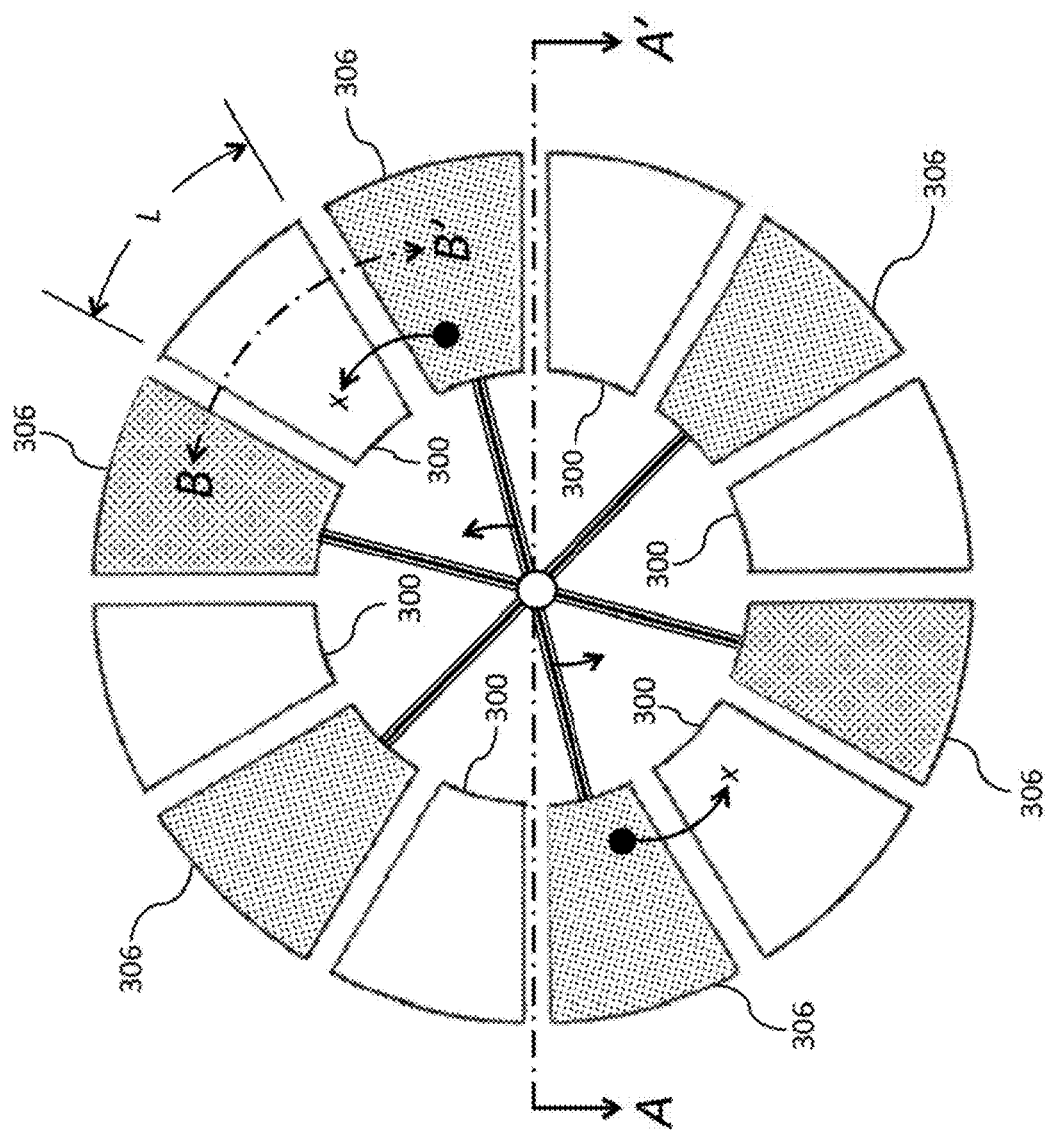
FIG. 3 depicts a top view of a multi-element electrostatic motor, revealing a fixed (stator) and a moveable (rotor) plate.
Figure 4:
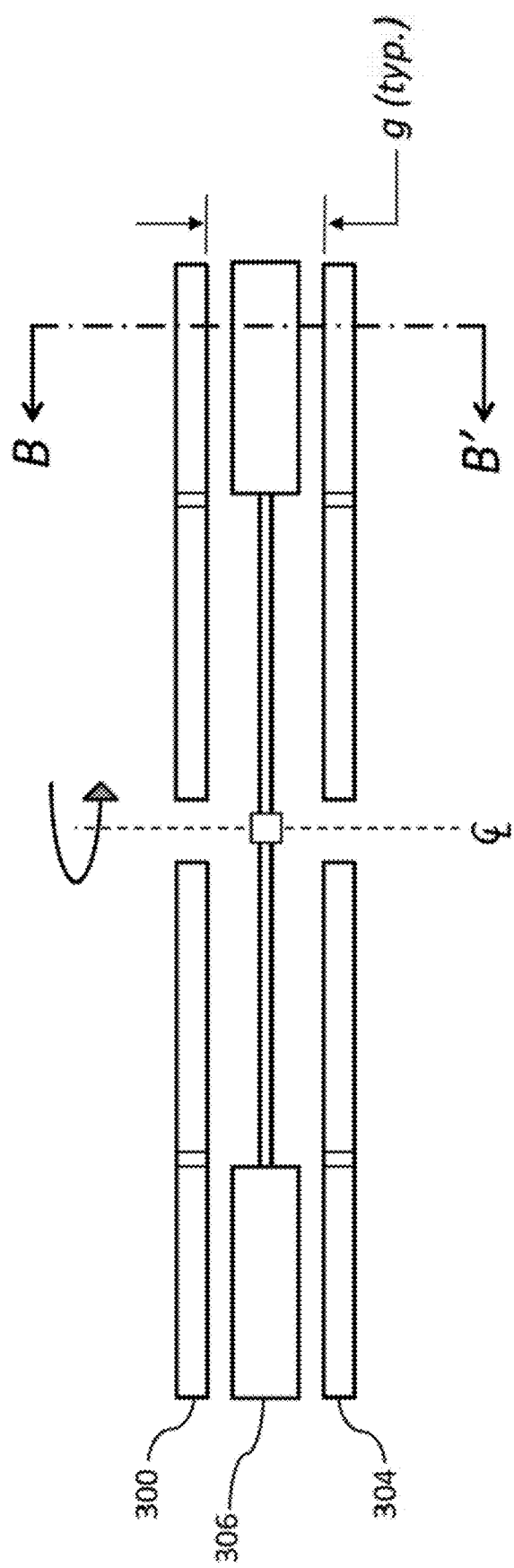
FIG. 4 depicts a cross-sectional, side view of the multi-element electrostatic motor of FIG. 3.

This result holds for the condition 0<x<L, in which case, the capacitance increases linearly, from $C_{min}$ to $C_{max}$, as the moveable plate enters the fixed set of capacitor plates. By symmetry, for L<x<2L, the capacitance begins to decrease linearly, from $C_{max}$ back to $C_{min}$. For the purposes of this discussion, we need only consider the first case, namely, that whereby the capacitance increases, with the condition that 0<x<L. In Equation (2) and Equation (3), fringe-field effects have been neglected, which, in the context of this discussion, provides a very good approximation for most practical device configurations and scale sizes. With reference to FIG. 2, assuming that the dimension of the parallel-plate capacitor in the x direction is L (meters), the constant α is given by the equation:

$$\alpha = \left(1 - \frac{C_{min}}{C_{max}}\right) \cdot (1/L) \quad (4)$$

Inserting Equation (4) for α into Equation (3) results in the following equation for f(x) for this geometry (again, subject to the condition that 0<x<L):

$$f(x) = \frac{C_{min}}{C_{max}} + \left[1 - \frac{C_{min}}{C_{max}}\right]\left[\frac{x}{L}\right] \quad (5)$$

Since F=dW/dx, where W=CV²/2 is the energy stored in the electric field of the capacitor, the magnitude of the electrostatic force exerted on the moveable plate for any f(x) can be shown to be the following:

$$F_{ES} = \left(\frac{1}{2}\right)\frac{df(x)}{dx}C_{max}V_0^2 \quad \text{(Newtons)} \quad (6)$$

As can be seen from Equation (6), an electrostatic force is exerted on the moveable plate, in the positive direction, when the capacitance is increasing with displacement (i.e., df(x)/dx>0). Conversely, the electrostatic force reverses direction when the capacitance is decreasing with displacement (i.e., df(x)/dx<0). This means that the voltage $V_0$ should be applied only while the capacitance is increasing with displacement, and should be turned off when it is decreasing. This result, in turn, implies that the duty cycle, d, of the drive system will be limited to a maximum value of 50 percent, depending on the details of the geometry of the capacitor. For the special case of a linear variation of capacitance with displacement, as given by Equation (5), the expression for the positive force, Equation (6), becomes, after differentiation:

$$F_{ES} = \left(\frac{1}{2}\right)\left[\frac{1 - \frac{C_{min}}{C_{max}}}{L}\right]C_{max}V_0^2 \quad \text{(Newtons)} \quad (7)$$

As an illustrative example of the force exerted in an electrostatic generator/motor with parameters appropriate to a flywheel energy storage module, consider a case where the value of $C_{min}/C_{max}$ is 0.25, $C_{max}$ is 0.01 µf, L is 25 mm, and $V_0$ is 40 kV. For this case, using Equation (7), the electrostatic force becomes $F_{ES}$=240 Newtons.

Figure 5:
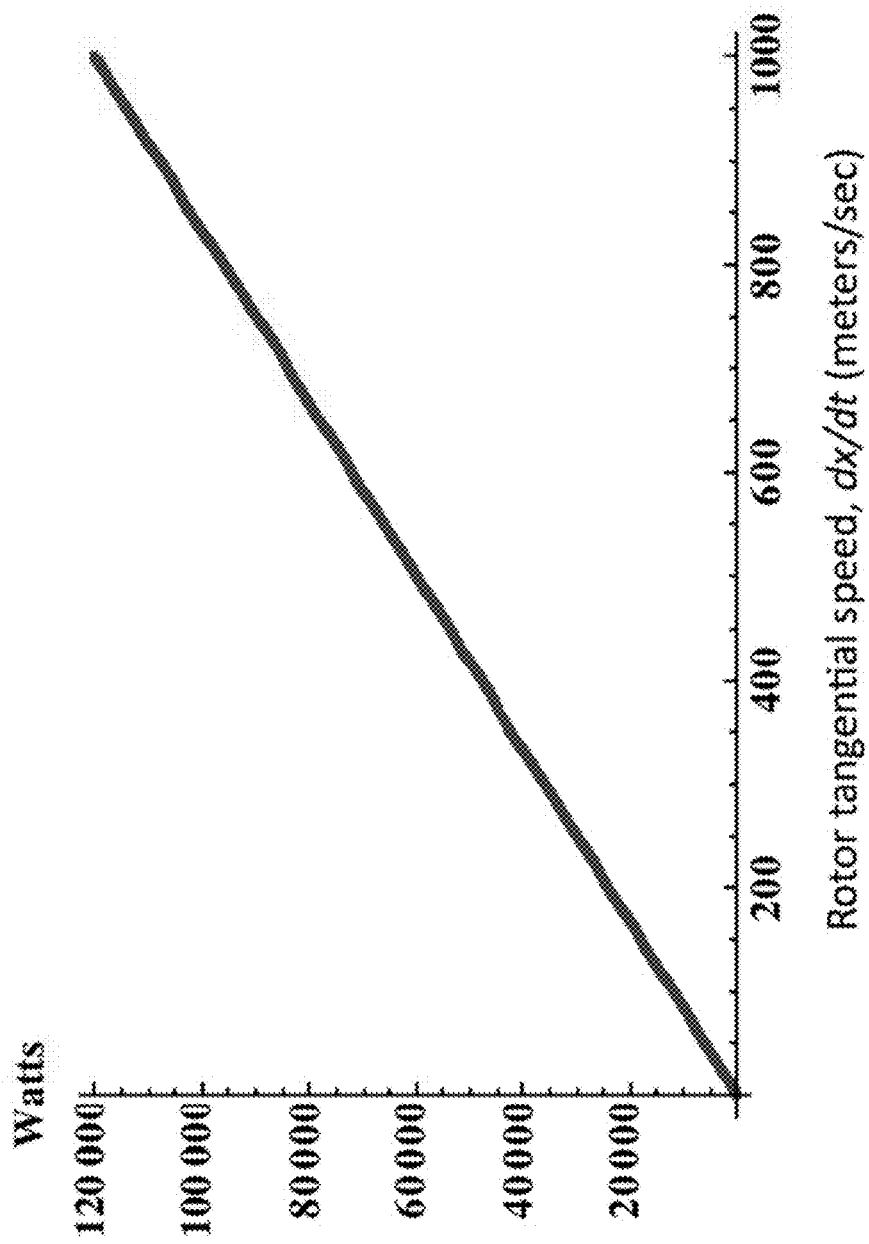
FIG. 5 shows a plot of the power output of an electrostatic motor as a function of the rotor tangential speed.

Equation (7) may also be used to calculate the motor power, given by the product of the force, $F_{ES}$ (Newtons), the velocity, v (m/sec) and the duty cycle, d. FIG. 5 is a plot of the motor power (in Watts) as a function of the tangential speed (dx/dt, in meters/second) for a duty cycle, d=0.5, given the above-stated device parameters of the capacitance and voltage. The speed range shown is appropriate to a flywheel rotor comprised of a carbon-fiber/epoxy material.

As can be seen from FIG. 5, the power outputs are quite large, considering that the capacity value assumed could be achieved in flywheel modules storing a few tens of kilowatt-hours of energy.

This invention takes advantage of an unusual functional dependence of an electrostatic motor, which differs significantly from that of other classes of motor, such as those employing forces exerted by magnetic fields, as derived by electromagnets and/or permanent magnets. This salient feature is that, as indicated by Equation (6), the motoring force depends on the square of the applied voltage (i.e., $F \sim V_o^2$), and is thus independent of its sign. The implication is that a burst of pulses, consisting of alternating amplitude pulses, and, synchronized with the rotation of the generator/rotor electrodes, are equally as effective in producing motor action as would be the case of relatively long, quasi-dc pulse-waveforms having the same rms value of voltage and duration. Given this equivalence, one can employ drivers that deliver high-frequency (tens of kHz) power such as is produced by modern solid-state inverters. This flexibility greatly reduces the size and cost of components, such as step-up transformers, while at the same time, operating at high efficiency. Moreover, the pulse parameters can be chosen to be within the resonant conditions of the structure for improved parametric performance and device efficiency.

Figure 6:
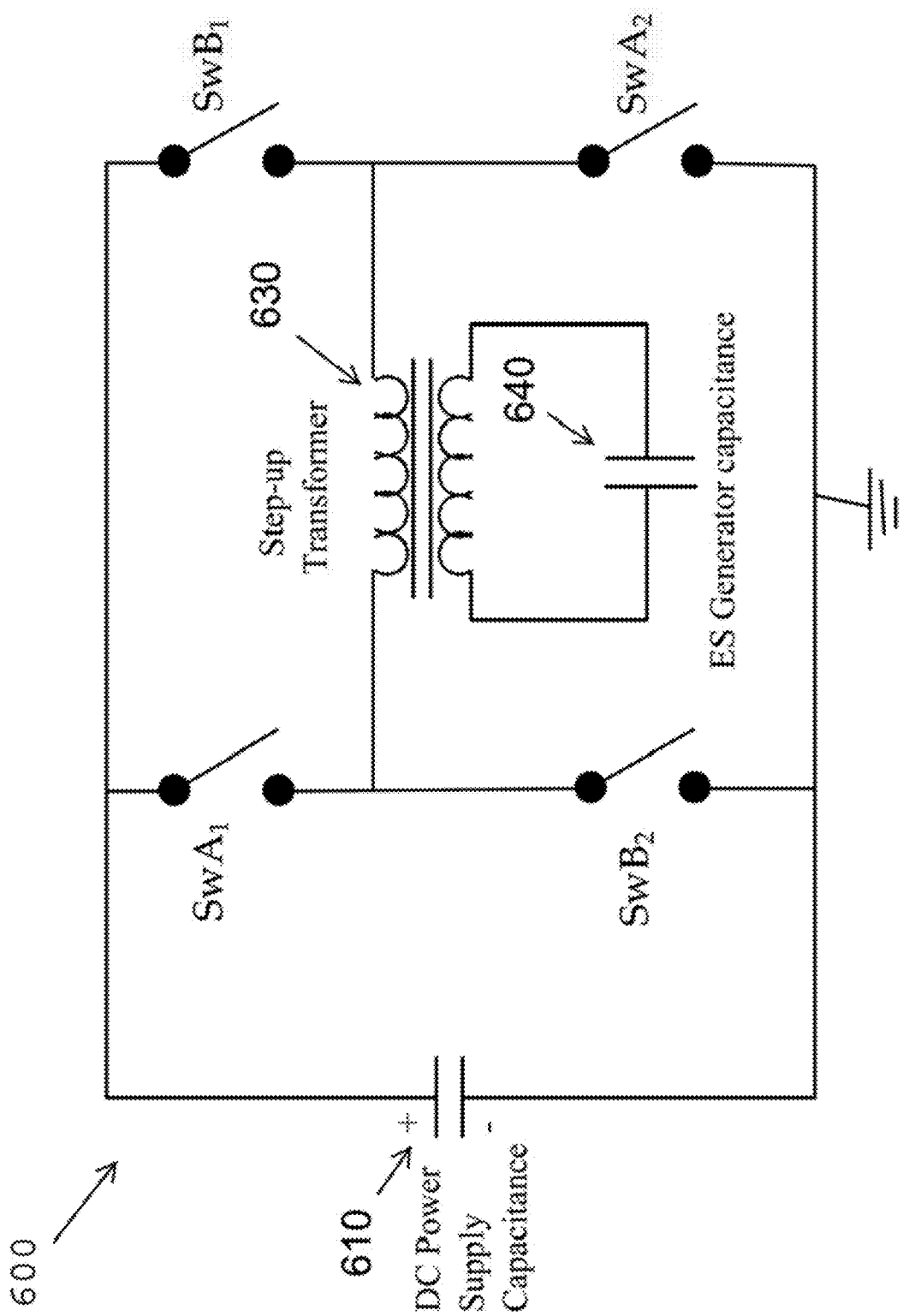
FIG. 6 shows a schematic of a bipolar waveform generator circuit to drive an ES motor.

FIG. 6 illustrates a simple inverter circuit, 600, which can perform the pertinent drive functions suggested above. The circuit consists of a DC power supply 610, followed by a switching network having switches $SwA_1$, $SwA_2$, $SwB_1$ and $SwB_2$, and further includes a step-up transformer 630 which provides the necessary waveform to drive the ES motor, the latter of which is represented by a capacitive load 640. In this embodiment, the DC power supply, in conjunction with high frequency operation of the switches, generates a continuous high frequency, square-wave output, V(t), depicted in FIG. 7 by waveform 700. This signal drives the primary of a step-up transformer 630 the secondary of which, in turn, drives the ES motor capacitance 640.

Referring again to FIG. 6, as the switches ($SwA_1$, $SwA_2$ and $SwB_1$, $SwB_2$) change state from "on to off" and "off to on" respectively, the polarity of the drive signal to the variable capacitor concomitantly changes sign. This results in a bipolar, high-voltage output waveform that drives the ES motor.

Figure 7:
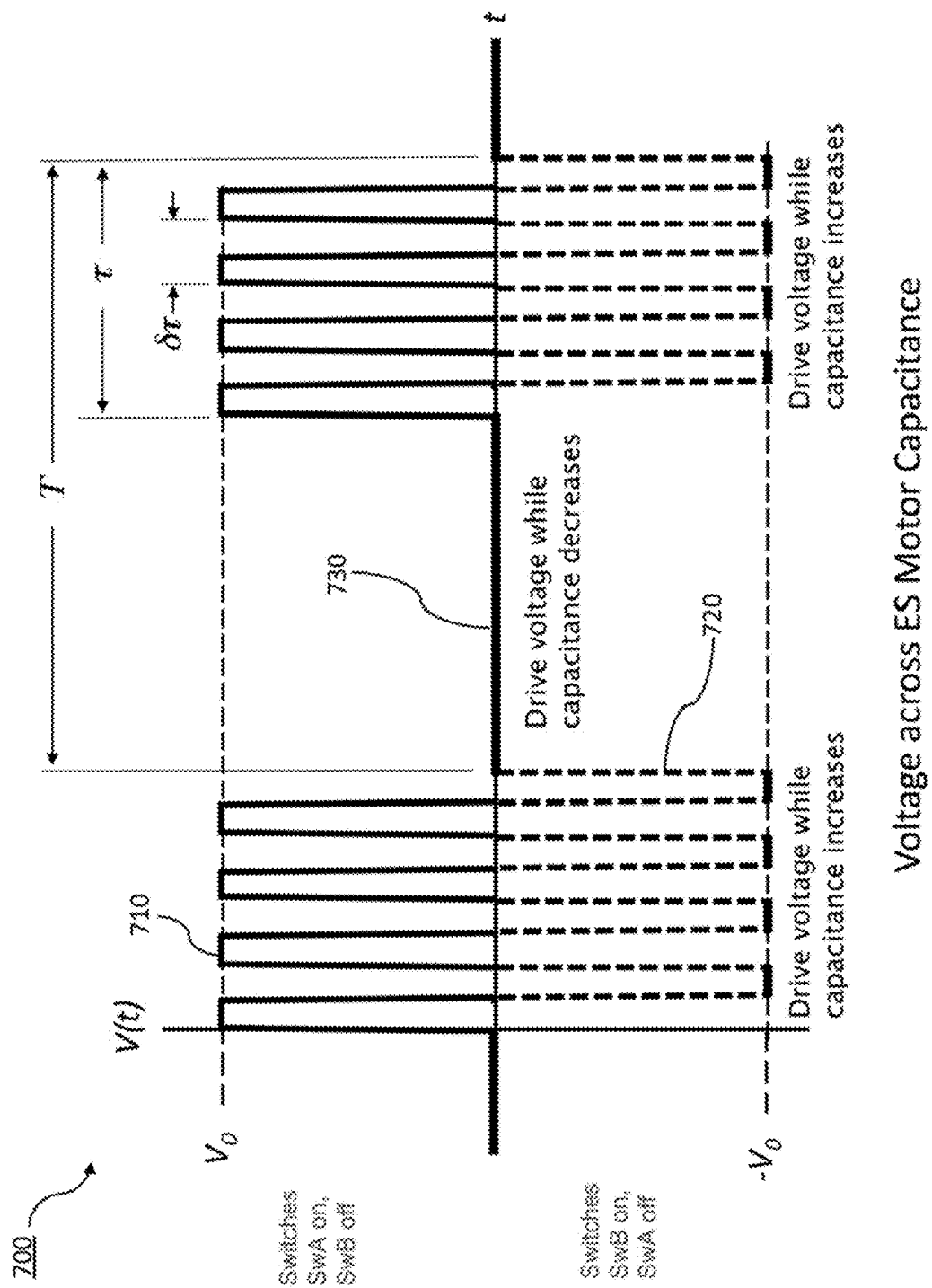
FIG. 7 shows details of the ES motor bipolar drive wave train, as generated by the circuit depicted in FIG. 6.

Details of the ES motor drive signal, are shown in FIG. 7. In this embodiment, the overall drive signal, 700, is comprised of an envelope waveform of period, T, and of amplitude, $V_0$. Within each period, T, a high frequency, burst signal is gated "on" for a duration, τ, followed by a zero voltage state 730 of duration T−τ. Hence, the duty cycle of this burst-mode drive signal is given by d=τ/T.

Within the envelope of duration, T, a short burst of pulses is gated on. The burst mode consists of a bipolar square-wave sequence of pulses. Each pulse, in turn, is characterized by a period δτ, comprised of a positive-going 710 and negative-going 720 voltage feature, which, in this case, consists of square waves.

In this example, the overall waveform is depicted as a symmetric signal, namely, the duty cycle of the overall signal, d, is 50%; and, in addition, the duty cycle of the pulses is also 50%. In general, the choice of these parameters will be a function of the ES motor configuration as well as the driving load, which is highly application dependent. Referring back to FIG. 6, the positive [negative] voltage component of each pulse within the waveform 700 corresponds to the switch set to position "A" ["B"]; and, the zero-state voltage level corresponds to the state where all switches are set to not allow current to flow through either switch position. During operation, the state of the switch is dynamically controlled, via open-loop or closed-loop system architectures.

In another operational embodiment, the servo-system, with proper pulse timing, can operate in such a way as to automatically recover the residual stored energy stored by the ES generator/motor at the termination of each pulse train. Under these conditions, the overall efficiency of the system should be very high, especially when one considers that the electrical-to-mechanical energy conversion efficiency of a motor based on electrostatic principles is nearly 100 percent, there being no hysteresis, eddy-current, or conductor-resistance losses such as occur in conventional electric motors.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A method, comprising:
providing an apparatus, comprising;
a step-up transformer comprising a primary winding and a secondary winding;
a variable capacitor electrically attached to said secondary windings, wherein said variable capacitor is configured to drive an electrostatic motor comprising a rotor and a stator;
a circuit first arm and a circuit second arm, wherein said first arm comprises a switch $SwA_1$ and a switch $SwB_2$, wherein said second arm comprises a switch $SwB_1$ and a switch $SwA_2$, wherein a first side of said primary winding is connected between said switch $SwA_1$ and said switch $SwB_2$ and wherein a second side of said primary winding is connected between said switch $SwB_1$ and said switch $SwA_2$; and
a DC power supply comprising a positive terminal connected to said switch $SwA_1$ and said switch $SwB_1$, wherein said switch $SwA_2$ and said switch $SwB_2$ are both connected to ground;
providing power from said DC power supply to at least one of said switch $SwA_1$ and said switch $SwB_2$;
rotating said rotor at a plurality of speeds;
alternating, while the capacitance of said variable capacitor is increasing, the voltage polarity across said primary winding, wherein the step of alternating is carried out at the same continuous frequency at all of said plurality of speeds; and
preventing, while the capacitance of said variable capacitor is decreasing, voltage from being applied across said primary winding.

2. The method of claim 1, wherein the step of alternating is carried out with an inverter operating at a frequency in a range of 1 to 10 times the highest operational frequency of the capacitance variation of said variable capacitor.

3. The method of claim 2, wherein said transformer operates in a frequency range of 1-10 times the highest operational frequency of the capacitance variation of said variable capacitor.

4. The method of claim 2, wherein said inverter is capable of inverting dc voltage to high-frequency pulses of at least 10 kHz.

5. The method of claim 2, further comprising a control circuit which senses the capacitance value of said variable capacitor and adjusts the on/off timing of said inverter circuit.

6. The method of claim 1, wherein when both said switch $SwA_1$ and said switch $SwA_2$ are closed and both said switch $SwB_1$ and said switch $SwB_2$ are open, a first circuit exists from said positive terminal through said switch $SwA_1$ through said primary winding through said switch $SwA_2$ to said ground and wherein when both said switch $SwB_1$ and said switch $SwB_2$ are closed and both said switch $SwA_1$ and said switch $SwA_2$ are open, a second circuit exists from said positive terminal through said switch $SwB_1$ through said primary winding through said switch $SwB_2$ to said ground, wherein said apparatus further comprises means for alternating between said first circuit and said second circuit for a first period of time.

7. The method of claim 6, wherein said apparatus further comprises means for simultaneously preventing, for a second period of time, electrical continuity in both said first circuit and said second circuit.

8. The method of claim 7, wherein said first period of time occurs only when the capacitance of said variable capacitor is increasing and wherein said second period of time occurs only when the capacitance of said variable capacitor is decreasing.

9. The method of claim 8, wherein said means for alternating comprises an inverter that is capable of alternating at a frequency in a range of 1 to 10 times the highest operational frequency of the capacitance variation.

10. The method of claim 9, wherein said transformer operates in a frequency range of 1 to 10 times the highest operational frequency of the capacitance variation.

11. The method of claim 1, wherein the step of alternating is carried out only while the capacitance of said variable capacitor is increasing.

12. The method of claim 1, wherein the step of preventing is carried out only while the capacitance of said variable capacitor is decreasing.

13. The method of claim 1, wherein the step of alternating is carried out only while the capacitance of said variable capacitor is increasing and wherein the step of preventing is carried out only while the capacitance of said variable capacitor is decreasing.

* * * * *